United States Patent [19]
Yoshida et al.

[11] Patent Number: 5,960,068
[45] Date of Patent: *Sep. 28, 1999

[54] COMMUNICATION APPARATUS FOR RECEIVING IDENTIFICATION INFORMATION OF PARTNER STATION, AND EXECUTING COMMUNICATION OPERATION IN ACCORDANCE WITH RECEIVED IDENTIFICATION INFORMATION

[75] Inventors: Takehiro Yoshida, Tokyo; Sadasuke Kurahayashi, Niiza; Kenji Hashimoto, Tokyo, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/675,098

[22] Filed: Jul. 3, 1996

Related U.S. Application Data

[62] Division of application No. 08/389,656, Feb. 16, 1995, abandoned.

[30] Foreign Application Priority Data

| Feb. 17, 1994 | [JP] | Japan | 6-043034 |
| Mar. 1, 1994 | [JP] | Japan | 6-031387 |
| Apr. 28, 1994 | [JP] | Japan | 6-114040 |

[51] Int. Cl.$^6$ ................................................. H04M 11/00
[52] U.S. Cl. .......................... 379/100.15; 379/100.16; 379/100.13; 379/142; 358/434
[58] Field of Search ................................ 379/95, 100, 142, 379/93, 93.02, 100.01, 100.08, 100.13, 100.17, 102.02, 100.15; 358/451, 400, 404, 434, 440, 444

[56] References Cited

U.S. PATENT DOCUMENTS

| 4,677,660 | 6/1987 | Yoshida | 379/100 |
| 4,729,033 | 3/1988 | Yoshida | 358/257 |
| 4,800,439 | 1/1989 | Yoshino | 379/100 |
| 4,815,121 | 3/1989 | Yoshida | 379/100 |
| 4,823,375 | 4/1989 | Yoshida | 379/100 |
| 4,942,598 | 7/1990 | Davis | 379/142 |
| 5,003,595 | 3/1991 | Collins et al. | 379/95 |
| 5,018,191 | 5/1991 | Catron et al. | 379/100 |
| 5,019,916 | 5/1991 | Ogura | 358/401 |
| 5,063,459 | 11/1991 | Nakatani et al. | 358/404 |
| 5,128,985 | 7/1992 | Yoshida et al. | 379/100 |
| 5,216,517 | 6/1993 | Kinoshita et al. | 379/100 |
| 5,224,156 | 6/1993 | Fuller et al. | 379/100 |
| 5,239,385 | 8/1993 | Ejiri | 379/100 |
| 5,239,388 | 8/1993 | Matsumoto | 358/451 |
| 5,276,731 | 1/1994 | Arbel et al. | 379/100 |
| 5,307,179 | 4/1994 | Yoshida | 358/440 |
| 5,351,289 | 9/1994 | Logsdon et al. | 379/95 |
| 5,377,260 | 12/1994 | Long | 379/95 |
| 5,388,150 | 2/1995 | Schneyer et al. | 379/142 |
| 5,420,693 | 5/1995 | Horiuchi et al. | 358/433 |

*Primary Examiner*—Stella Woo
*Attorney, Agent, or Firm*—Fitzpatrick, Cella, Harper & Scinto

[57] ABSTRACT

A communication apparatus includes a communication unit for performing a communication, a speech communication unit for performing a speech communication, a detection unit for detecting the telephone number of the calling side before connection of a call, a registration unit for registering the telephone number of the calling side, and a switching unit for switching a communication mode between the communication unit and the speech communication unit on the basis of the telephone number of the calling side detected by the detection unit, and the telephone number registered in the registration unit.

18 Claims, 12 Drawing Sheets

COMMUNICATION APPARATUS FOR RECEIVING IDENTIFICATION INFORMATION OF PARTNER STATION, AND EXECUTING COMMUNICATION OPERATION IN ACCORDANCE WITH RECEIVED IDENTIFICATION INFORMATION

This application is a division of application Ser. No. 08/389,656 filed Feb. 16, 1995, now abandoned.

BACKGROUND OF THE INVENTION

1. Field of the Invention

The present invention relates to a communication apparatus for receiving the identification information of a partner station, and executing a communication operation in accordance with the received identification information.

2. Related Background Art

As a conventional apparatus of this type, for example, a facsimile apparatus receives a procedure signal upon connection of a line with a partner station. The procedure signal received from the partner station includes information such as the name and telephone number of the partner station. The telephone number or numbers of a specific partner station or stations is or are registered in a memory of the facsimile apparatus in advance, and the facsimile apparatus checks based on the procedure signal if the received telephone number is registered in the memory. The facsimile apparatus permits facsimile reception from only a partner station registered in the memory, or rejects facsimile reception from a partner station registered in the memory. Such a facsimile apparatus is known.

However, the above-mentioned facsimile apparatus can only make a selection as to whether or not a facsimile communication is performed.

On the other hand, some users commonly use a single telephone line both for a speech communication using a telephone set, and for a facsimile communication. Thus, in order to obviate a user's operation of manually switching the telephone line between a speech communication and a facsimile communication, the patent applications (U.S. Pat. Nos. 4,800,439 and 4,677,660) in which a facsimile apparatus detects, upon connection of a line, whether or not a signal associated with a facsimile communication is received, and automatically switches the telephone line between a speech communication and a facsimile communication, have been proposed.

However, in the above-mentioned U.S. patent applications, since the facsimile apparatus must monitor a received signal for a predetermined period of time, a relatively long time is required until an actual speech or facsimile communication can be started.

As a service of a telephone office, a service for informing the telephone number of a calling station between two adjacent calling signals upon reception of an incoming call is available.

SUMMARY OF THE INVENTION

It is an object of the present invention to provide a communication apparatus which can switch a telephone line between a speech communication and a data communication within a short period of time in consideration of the above-mentioned situation.

DETAILED DESCRIPTION OF THE PREFERRED EMBODIMENTS

First Embodiment

Figure 1:
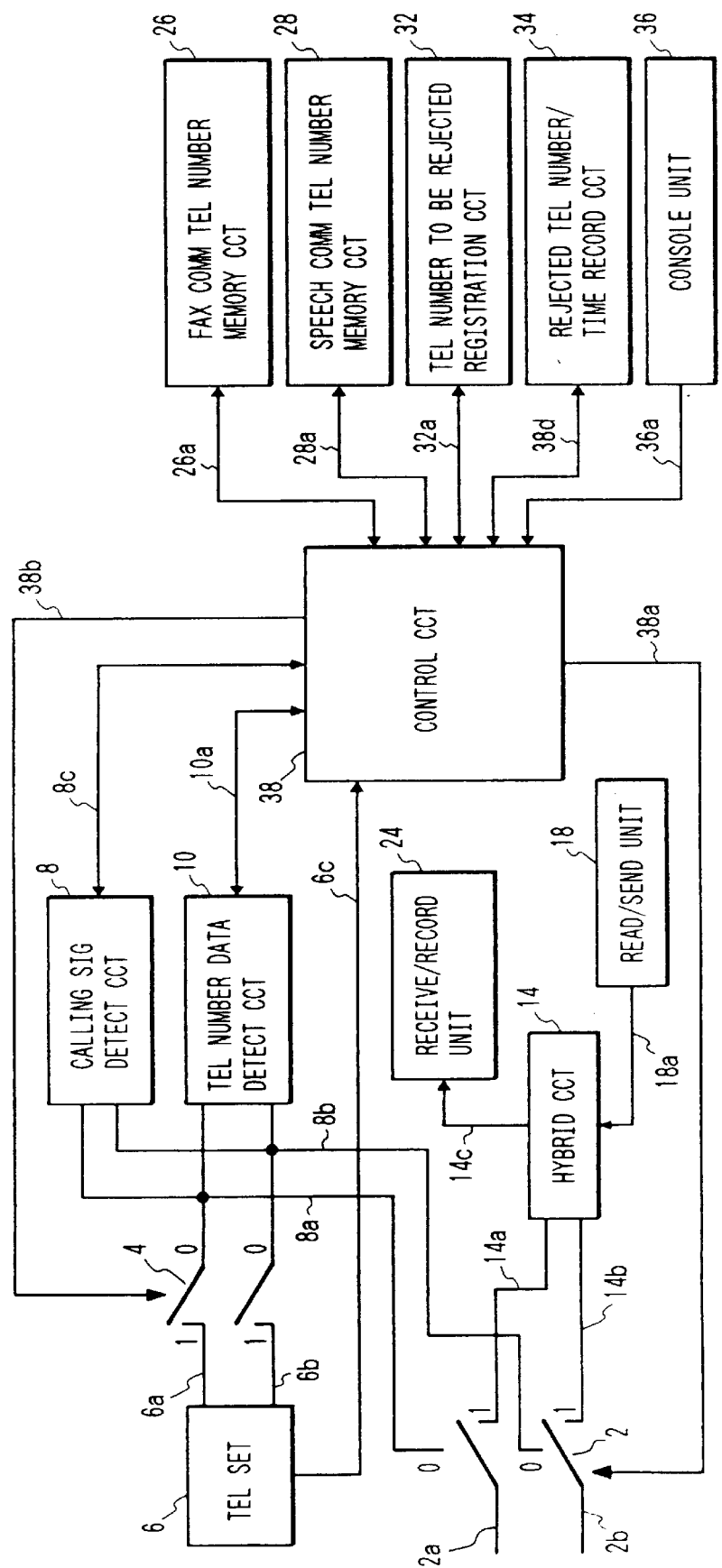
FIG. 1 is a block diagram showing the arrangement according an embodiment of the present invention.

FIG. 1 is a block diagram showing the arrangement of a facsimile apparatus according to an embodiment of the present invention.

Referring to FIG. 1, signal lines 2a and 2b correspond to a telephone line. A CML (Connect Modem to Line) 2 is a relay for switching the telephone line between the facsimile communication unit side and the speech communication unit side. When a signal of signal level "0" is output on a signal line 38a, the CML relay 2 connects the telephone line to the telephone set 6 side, i.e., connects the signal lines 2a and 2b to signal lines 8a and 8b. On the other hand, when a signal of signal level "1" is output on the signal line 38a, the CML relay 2 connects the telephone line to the facsimile side, i.e., connects the signal lines 2a and 2b to signal lines 14a and 14b. In a normal state, the telephone line is connected to the telephone set 6 side.

A TEL relay 4 is a relay for performing non-ringing call reception. When a signal of signal level "0" is output on a signal line 38b, the relay 4 sets signal lines 6a and 6b and the signal lines 8a and 8b in an open state, thus allowing non-ringing call reception. In this state, the telephone set 6 cannot generate an outgoing call, either. When a signal of signal level "1" is output on the signal line 38b, the relay 4 sets the signal lines 6a and 6b and the signal lines 8a and 8b in a closed state, thus allowing the telephone set to ring upon reception of an incoming call. In this case, the telephone set can originate a call. Normally, a non-ringing call termination state is set, and the signal lines 6a and 6b and the signal lines 8a and 8b are set in an open state.

Upon detection of an off-hook state (when an operator issues a speech communication request), the TEL relay 4 sets the signal lines 6a and 6b and the signal lines 8a and 8b in a closed state. For this reason, a signal indicating an off-hook state is output onto a signal line 6c. Note that a signal of signal level "0" is output in an on-hook state, and a signal of signal level "1" is output in an off-hook state.

A calling signal detect circuit 8 receives signals output onto the signal lines 8a and 8b, and it outputs a signal of signal level "1" onto a signal line 8c upon detection of a calling signal (or ringing signal); it outputs a signal of signal level "0" onto the signal line 8c upon detection of no calling signal.

A telephone number data detect circuit 10 is a circuit for detecting telephone number data output between two adjacent calling signals. When the circuit 10 detects telephone number data upon reception of signals on the signal lines 8a and 8b, it outputs the telephone number data onto a signal line 10a.

A hybrid circuit 14 separates transmission system signals and reception system signals from each other. More specifically, a transmission signal on a signal line 18a is output onto the telephone line via the signal lines 14a and 14b. On the other hand, a signal sent from a partner station is output onto a signal line 14c via the signal lines 14a and 14b.

A read/send unit 18 is a circuit for reading, encoding, and modulating image data of an original, and sending a procedure signal, and these signals are output onto the signal line 18a.

A receive/record unit 24 is a circuit for receiving a received signal output on the signal line 14a, and for demodulating, decoding, and recording received image data, and demodulating a procedure signal.

A facsimile communication telephone number memory circuit 26 is a circuit for storing a facsimile communication telephone number of the telephone number data output between two adjacent calling signals. This data is stored via a signal line 26a.

A speech communication telephone number memory circuit 28 is a circuit for storing a speech communication telephone number of the telephone number data output between two adjacent calling signals. This data is stored via a signal line 28a.

A telephone number to be rejected registration circuit 32 is a circuit for registering a telephone number to be rejected of the telephone number data output between two adjacent calling signals. This data is registered via a signal line 32a.

A rejected telephone number/time record circuit 34 is a circuit for recording a rejected station (telephone number) and incoming date/time of the telephone number data output between two adjacent calling signals, and records data output on a signal line 38d.

A console unit 36 has registration keys used for registering data in the above-mentioned memory and registration circuits 26, 28, and 32, a ten-key pad, One-touch dial keys, abbreviated dial keys, various mode keys, function keys, and the like, and depression data of each of these keys is output onto a signal line 36a.

A control circuit 38 controls, in, e.g., the first embodiment of the present invention, a series of processes for detecting telephone number data of a calling station side, which is sent at a timing between two adjacent calling signals, registering facsimile communication telephone numbers in advance, generating bell sounds from the telephone set upon call termination from a station other than those corresponding to the registered telephone numbers, and performing a facsimile communication in a non-ringing mode upon call termination from a station corresponding to one of the registered telephone numbers, in addition to processes in a conventional facsimile apparatus.

Figure 2:
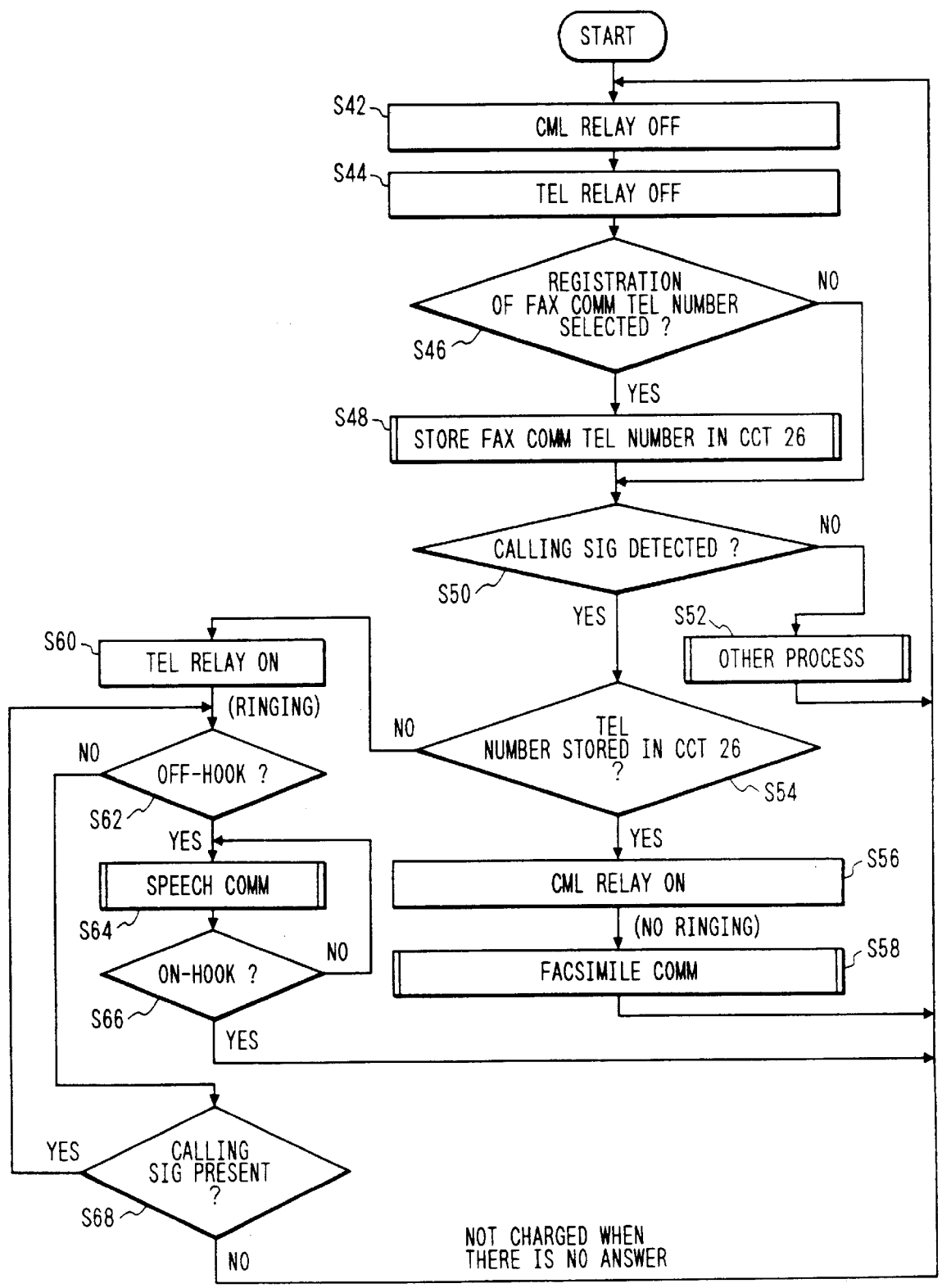
FIG. 2 is a flow chart showing the operation of the first embodiment of the present invention.

The process operation in the first embodiment of the present invention will be described below. FIG. 2 is a flow chart showing the control operation of the control circuit 38 in the first embodiment. Note that the circuits 28, 32, and 34 in FIG. 1 are not used in the first embodiment of the present invention, but are used in the second and subsequent embodiments.

Referring to FIG. 2, in step S42, a signal of signal level "0" is output onto the signal line 38a to turn off the CML relay, i.e., to connect the signal lines 2a and 2b to the signal lines 8a and 8b.

In step S44, a signal of signal level "0" is output onto the signal line 38b to turn off the TEL relay, i.e., to set the signal lines 6a and 6b in an open state.

In step S46, data output on the signal line 36a is received to check if a registration mode of a facsimile communication telephone number is selected. If YES in step S46, the flow advances to step S48; otherwise, the flow jumps to step S50.

In step S48, telephone number data sent between two adjacent calling signals is received, and a facsimile communication telephone number is registered in the circuit 26 on the basis of the received telephone number data.

In step S50, data on the signal line 8c is received to check if a calling signal is detected. If YES in step S50, the flow advances to step S54; otherwise, the flow advances to step S52. In step S52, other processes are performed.

In step S54, telephone number data sent between two adjacent calling signals is received from the signal line 10a to check if the received telephone number data is registered in the memory circuit 26. If YES in step S54, the flow advances to step S56; otherwise, the flow advances to step S60.

In step S56, a signal of signal level "1" is output onto the signal line 38a to turn on the CML relay, i.e., to connect the signal lines 2a and 2b to the signal lines 14a and 14b. In step S58, a facsimile communication is performed. In this case, the facsimile communication is performed in a non-ringing mode. Thereafter, the flow returns to step S42.

In step S60, a signal of signal level "1" is output onto the signal line 38b to turn on the TEL relay 4. With this operation, the signal lines 6a and 6b are connected to the signal lines 8a and 8b, and bell sounds are generated from the telephone set 6 while the calling signals are input.

In step S62, data on the signal line 6c is input to check if an off-hook state is detected. If YES in step S62, the flow advances to step S64 to perform a speech communication, and data on the signal line 6c is received in step S66. If an on-hook state is detected in step S66, the flow returns to step S42. On the other hand, if NO in step S62, the flow advances to step S68, and data on the signal line 8a is received to check if calling signals are still present. If YES in step S68, the flow returns to step S62 to monitor an off-hook state; otherwise, the flow returns to step S42.

With the above-mentioned operations, when an operator does not answer the telephone call in step S62, no communication charge is generated. More specifically, a facsimile communication and a speech communication can be automatically switched based on telephone number data of a calling station in a non-charged state.

Second Embodiment

The second embodiment of the present invention will be described below.

In the first embodiment, telephone number data sent between two adjacent calling signals is detected, and a facsimile or speech communication is determined based on the detected telephone number data. In this case, this determination is achieved by storing facsimile communication telephone numbers in the memory circuit 26. However, in the second embodiment, speech communication telephone numbers are registered in the memory circuit 28, and a speech communication is performed upon detection of a calling signal from a station corresponding to one of the registered telephone numbers; a facsimile communication is performed upon detection of a calling signal from a non-registered station.

Figure 3:
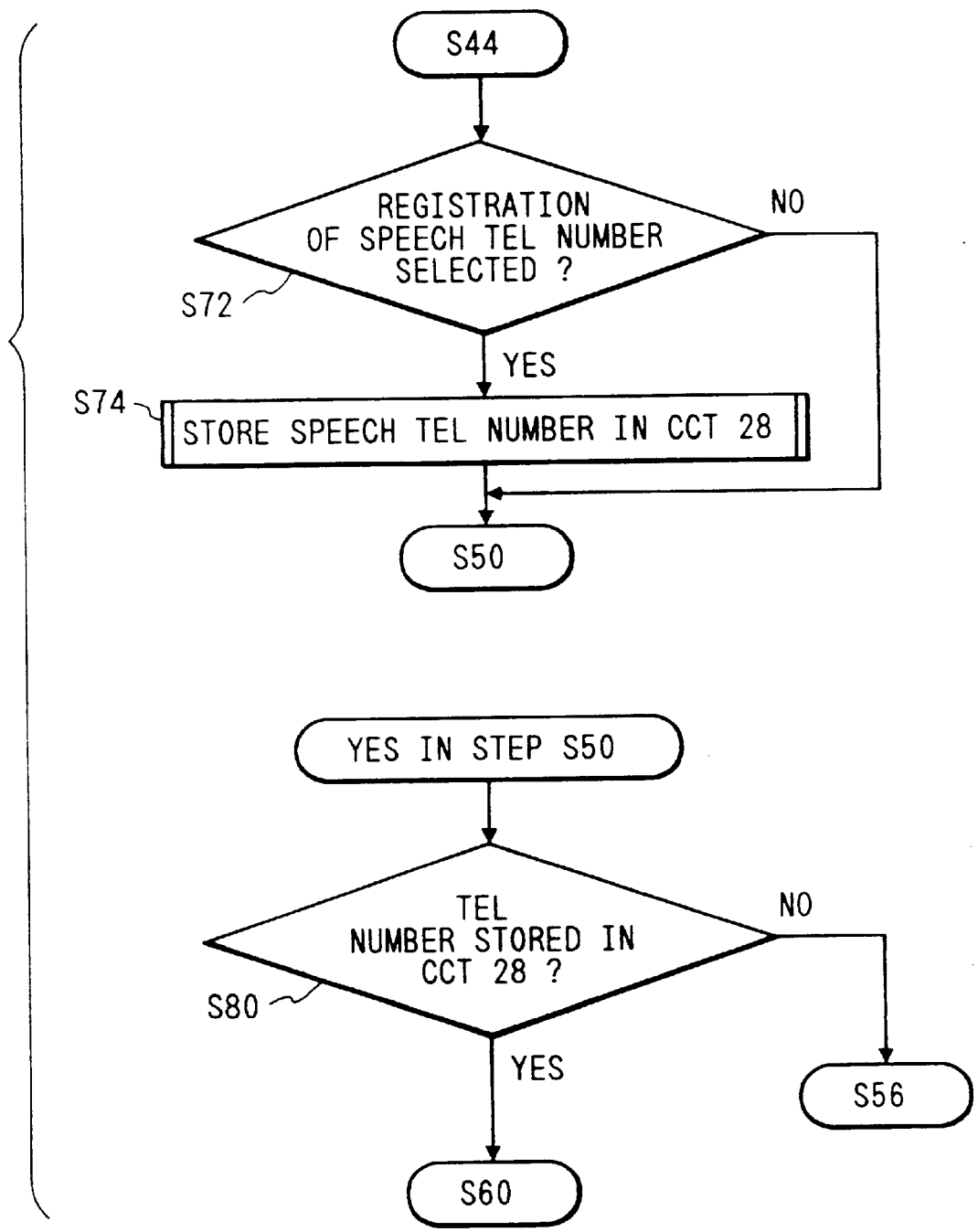
FIG. 3 is a flow chart showing the operation of the second embodiment of the present invention.

FIG. 3 is a flow chart showing operations, different from those in the first embodiment (FIG. 2), of the control operation of the control circuit 38 in the second embodiment. Note that the circuits 26, 32, and 34 in FIG. 1 are not used in the second embodiment.

Referring to FIG. 3, in step S72, data on the signal line 36a is received to check, based on the received telephone number data sent between two adjacent calling signals, if a registration mode of a speech communication telephone number is selected. If YES in step S72, the flow advances to step S74; otherwise, the flow advances to step S50 in FIG. 2.

In step S74, telephone number data sent between two adjacent calling signals is received, and a speech communication telephone number is registered in the memory circuit 28 on the basis of the received telephone number data. Thereafter, the flow advances to step S50 in FIG. 2.

In step S80, telephone number data sent between two adjacent calling signals is received from the signal line 10a to check if this telephone number data is registered in the memory circuit 28. If YES in step S80, the flow advances to step S60 in FIG. 2 to perform a speech communication; otherwise, the flow advances to step S56 in FIG. 2 to perform a facsimile communication.

Third Embodiment

The third embodiment of the present invention will be described below.

In the third embodiment, using both the memory circuit 26 for registering speech communication telephone numbers and the memory circuit 28 for registering facsimile communication telephone numbers, if a registered speech communication telephone number is detected upon detection of a calling signal, a speech communication is performed; if a facsimile communication telephone number is detected, a facsimile communication is performed. On the other hand, when a telephone number is other than the registered telephone numbers, the incoming call is rejected, and the rejected telephone number and the date/time of rejection are recorded in the record circuit 34.

Figure 4:
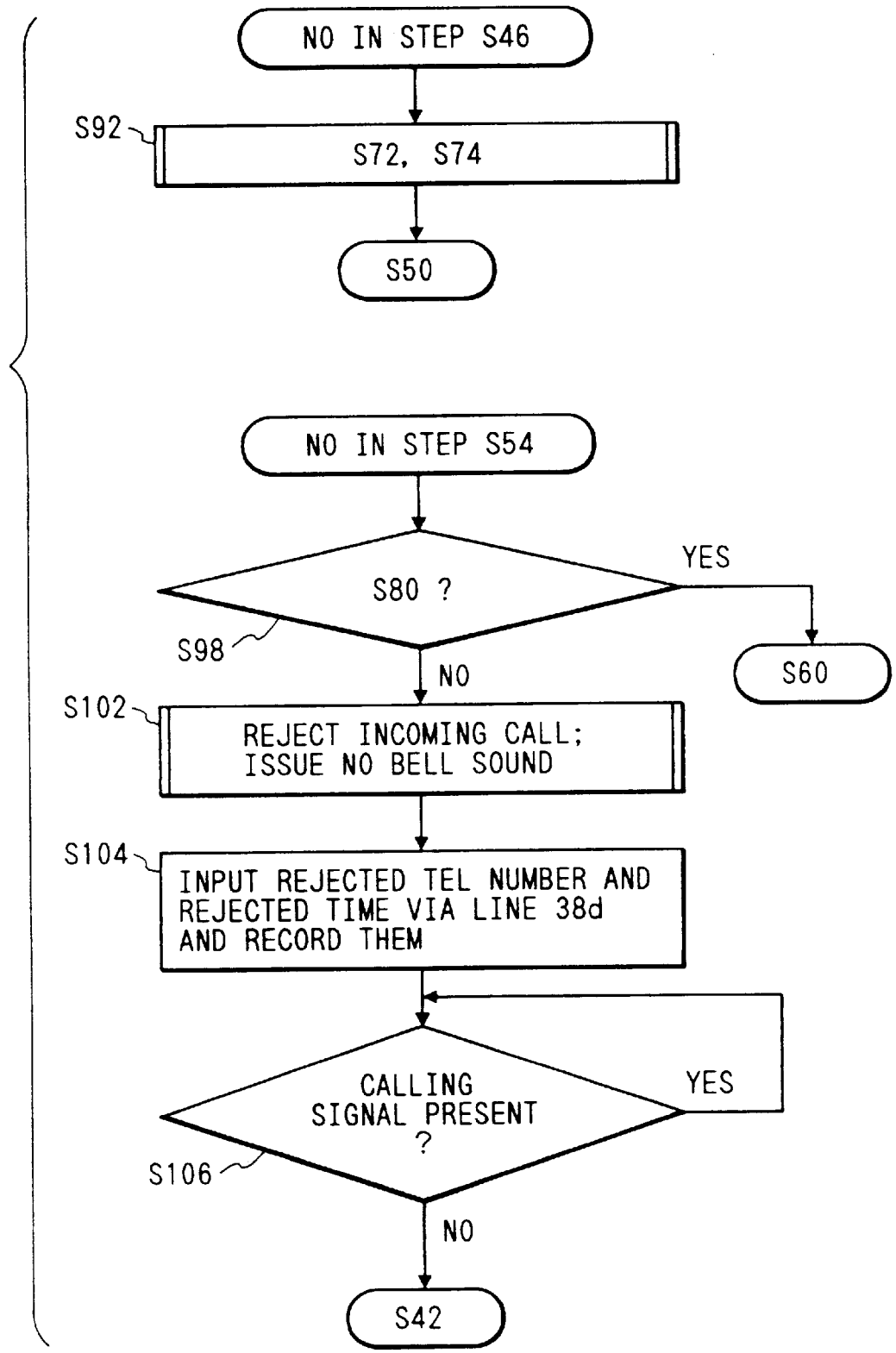
FIG. 4 is a flow chart showing the operation of the third embodiment of the present invention.

FIG. 4 is a flow chart showing operations different from those in the above embodiments (FIGS. 2 and 3) of the control operations of the control circuit 38 in the third embodiment. Note that the circuit 32 in FIG. 1 is not used in the third embodiment.

Referring to FIG. 4, in step S92, the processes in steps S72 and S74 in FIG. 3 are performed. When the registration mode of a speech communication telephone number is selected, the telephone number is registered in the memory circuit 28. Thereafter, the flow advances to step S50 and subsequent steps in FIG. 2.

In step S98, decision step S80 in FIG. 3 above is executed. If the telephone number of a calling station is registered as a speech communication telephone number, the flow advances to step S60 in FIG. 2; otherwise, the flow advances to step S102.

In step S102, the incoming call is rejected, and no bell sound is generated in this case. In step S104, the date/time and the rejected telephone number input via the signal line 10a are recorded in the record circuit 34 via the signal line 38d.

In step S106, data on the signal line 8a is received to check if a calling signal is present. If YES in step S106, the control waits in this state; otherwise, the flow advances to step S42 in FIG. 2.

Fourth Embodiment

The fourth embodiment of the present invention will be described below.

In the fourth embodiment, in addition to the first to third embodiments, a telephone number to be rejected is registered, and when an incoming call from a station corresponding to the registered telephone number is detected, the incoming call is rejected, and a message indicating that the incoming call is rejected is recorded in the circuit 34.

Figure 5:
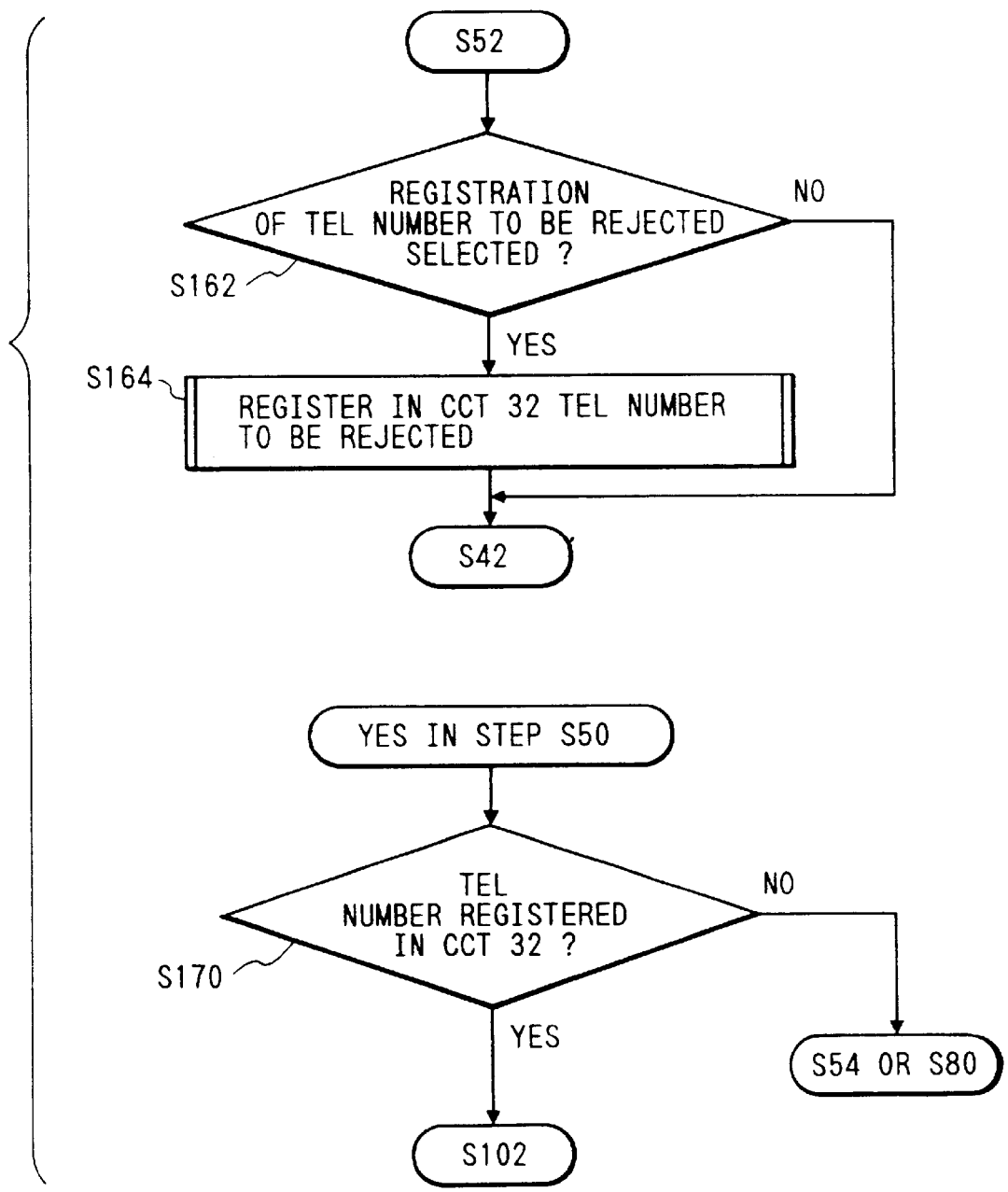
FIG. 5 is a flow chart showing the operation of the fourth embodiment of the present invention.

FIG. 5 is a flow chart showing operations different from those in the first and third embodiments (FIGS. 2 and 4) of the control operations of the control circuit 38 in the fourth embodiment.

Referring to FIG. 5, in step S162, a signal on the signal line 36a is received to check if a registration mode of a telephone number to be rejected is selected. If YES in step S162, the flow advances to step S164 to register a telephone number to be rejected in the circuit 32; otherwise, the flow advances to step S42 in FIG. 2.

It is checked in step S170 if the telephone number of the calling station detected based on a signal on the signal line 10a is registered in the circuit 32. If YES in step S170, the flow advances to step S102 in FIG. 4 to reject the incoming call; otherwise, the flow advances to step S54 in FIG. 2 or step S80 in FIG. 3 and does not reject the incoming call.

Fifth Embodiment

Figure 6:
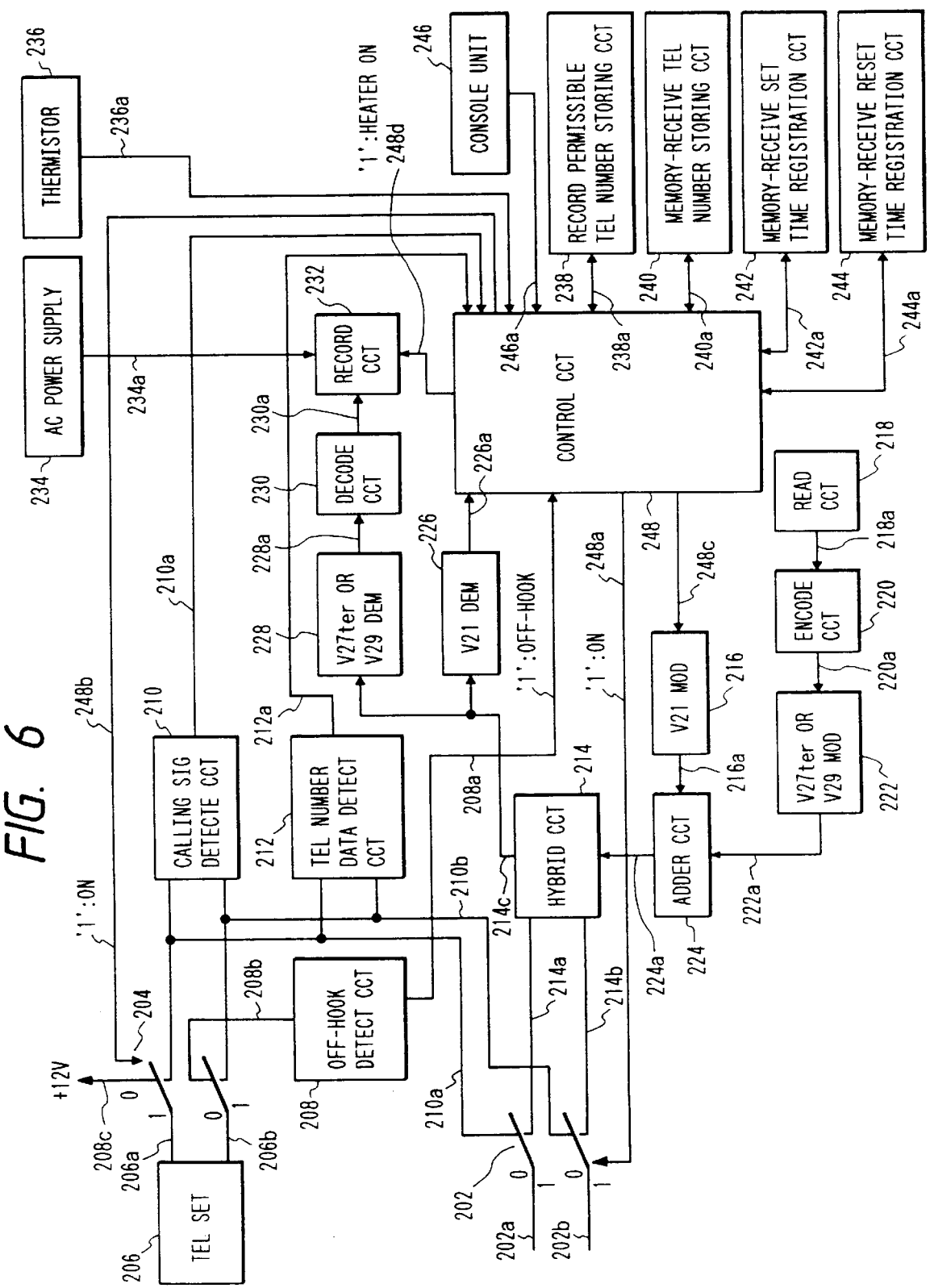
FIG. 6 is a block diagram showing the fifth embodiment of the present invention.

FIG. 6 is a block diagram showing the fifth embodiment of the present invention.

When a signal of signal level "1" is output onto a signal line 248a, a CML relay 202 connects a telephone line (signal lines 202a and 202b) to a facsimile communication unit (signal lines 214a and 214b); when a signal of signal level "0" is output onto the signal line 248a, the relay 202 connects the telephone line (signal lines 202a and 202b) to a telephone set 206 side (signal lines 210a and 210b).

A TEL relay 204 is a relay for detecting an off-hook state in a non-ringing call termination mode and during a communication. When a signal of signal level "1" is output onto a signal line 248b, the relay 204 connects signal lines 206a and 206b to the signal lines 210a and 210b; when a signal of signal level "0" is output onto the signa line 248b, the relay 204 connects the signal lines 206a and 206b to signal lines 208c and 208b.

When a signal of signal level "0" is output onto the signal line 248b, an off-hook detect circuit 208 determines if the telephone set is in an off-hook state. When an off-hook state is detected, the circuit 208 outputs a signal of signal level "1" onto a signal line 208a; when an on-hook state is detected, the circuit 208 outputs a signal of signal level "0" onto the signal line 208a.

A calling signal detect circuit 210 receives signals on the signal lines 210a and 210b. When the circuit 210 detects a calling signal, it outputs a signal of signal level "1" onto the signal line 210a; otherwise, it outputs a signal of signal level "0" onto the signal line 210a.

A telephone number data detect circuit 212 is a circuit for detecting telephone number data sent between two adjacent calling signals, and outputs detected telephone number data onto a signal line 212a.

A hybrid circuit 214 separates transmission system signals and reception system signals from each other. More specifically, a transmission signal on a signal line 224a is output onto the telephone line via signal lines 214a and 214b. On the other hand, a signal sent from a partner station is output onto a signal line 214c via the signal lines 214a and 214b.

A V.21 modulator 216 performs modulation based on the known CCITT recommendation V.21. The modulator 216 modulates a procedure signal (signal line 248c) from a control circuit 248, and outputs the modulated signal to an adder circuit 224 via a signal line 216a.

A read circuit 218 sequentially reads an image signal for one main scanning line from an original to be sent, generates a signal train indicating two values (black and white), and sends this data to an encode circuit 220 via a signal line 218a. The read circuit 218 comprises an image pickup element such as a CCD (charge coupled device) and an optical system.

The encode circuit 220 receives read data output on the signal line 218a, encodes the read data (by MH or MR encoding), and outputs encoded data onto a signal line 220a.

A V.27ter or V.29 modulator 222 receives encoded data from the signal line 212a, modulates the data based on the known CCITT recommendation V.27ter (differential phase modulation) or V.29 (quadrature modulation), and outputs the modulated data to the adder circuit 224 via a signal line 222a.

The adder circuit 224 is a circuit for adding the outputs from the modulators 216 and 222. The output from the adder 224 is supplied to the hybrid circuit 214.

A V.21 demodulator 226 performs demodulation based on the known CCITT recommendation V.21. The demodulator 226 receives a procedure signal from the hybrid circuit 214 via the signal line 214c, performs V.21 demodulation, and supplies demodulated data to the control circuit 248 via a signal line 226a.

A V.27ter or V.29 demodulator 228 performs demodulation based on the known CCITT recommendation V.27ter or V.29. The demodulator 228 receives a modulated image signal from the hybrid circuit 214, demodulates the image signal, and supplies the demodulated data to a decode circuit 230 via a signal line 228a.

The decode circuit 230 is a circuit for decoding data from the signal line 228a (by MH decoding or MR decoding), and outputs the decoded data to a record circuit 232 via a signal line 230a.

The record circuit 232 is a record circuit (LBP) for receiving data output on the signal line 230a, and sequentially performing recording line by line at an equal speed.

When a signal of signal level "1" is output on a signal line 248d, the record circuit 232 connects electric power from an AC power supply 234, which is output on a signal line 234a, to a heater to turn on the heater; when a signal of signal level "0" is output on the signal line 248d, it does not connect electric power from the AC power supply 234, which is output on the signal line 234a, to the heater to turn off the heater.

The AC power supply 234 outputs, e.g., electric power of AC 100 V onto the signal line 234a.

A thermistor 236 detects the temperature of a fixing unit. Based on the temperature detected by the thermistor, the ON/OFF control of the heater is performed. More specifically, when a receive mode is selected, the temperature of the thermistor is checked, and a heat operation is performed as needed.

A storing circuit 238 is a circuit for checking telephone number data sent between two adjacent calling signals, and discriminating if the detected telephone number data corresponds to a record permissible telephone number. Assume that the record operation is permitted when an incoming call from a station corresponding to the telephone number registered in the storing circuit 238 is detected; the record operation is inhibited when an incoming call from a station other than a station corresponding the telephone number registered in the storing circuit 238 is detected.

A storing circuit 240 is a circuit for checking telephone number data sent between two adjacent calling signals, and storing a memory-receive telephone number. When an incoming call from a station corresponding to a telephone number registered in the storing circuit 240 is detected, memory reception is performed; otherwise, no memory reception is performed.

A set time registration circuit 242 is a circuit for registering a time at which a memory-receive mode is set, and stores the time in the 24-hour system (hh:mm, e.g., 20:00).

A reset time registration circuit 244 is a circuit for registering a time at which the memory-receive mode is reset (i.e., the memory-receive mode is canceled), and stores the time in the 24-hour system (hh:mm, e.g., 9:00).

A console unit 246 has keys used for registering data in the circuits 238, 240, 242, and 244, a start key, one-touch dial keys, abbreviated dial keys, a ten-key pad, function keys, and the like. Data of a depressed key is output onto a signal line 246a.

The control circuit 248 controls, in the fifth embodiment of the present invention, the entire processes of a facsimile apparatus for performing LBP recording, such that when a record operation is selected in a standby state without performing pre-heating, the thermistor temperature is detected, and after a heat operation is performed as needed, a record operation is executed. In particular, when an incoming call is detected, the control circuit 248 detects telephone number data sent between two adjacent calling signal using the detect circuit 212, and when an incoming call from a record permissible calling station is detected, the control circuit 248 controls to check the thermistor temperature data and to perform a heat operation as needed so as to start pre-heating; when an incoming call sent from a calling station which does not require a record operation is detected, the control circuit 248 controls not to perform a heat operation.

Figure 7:
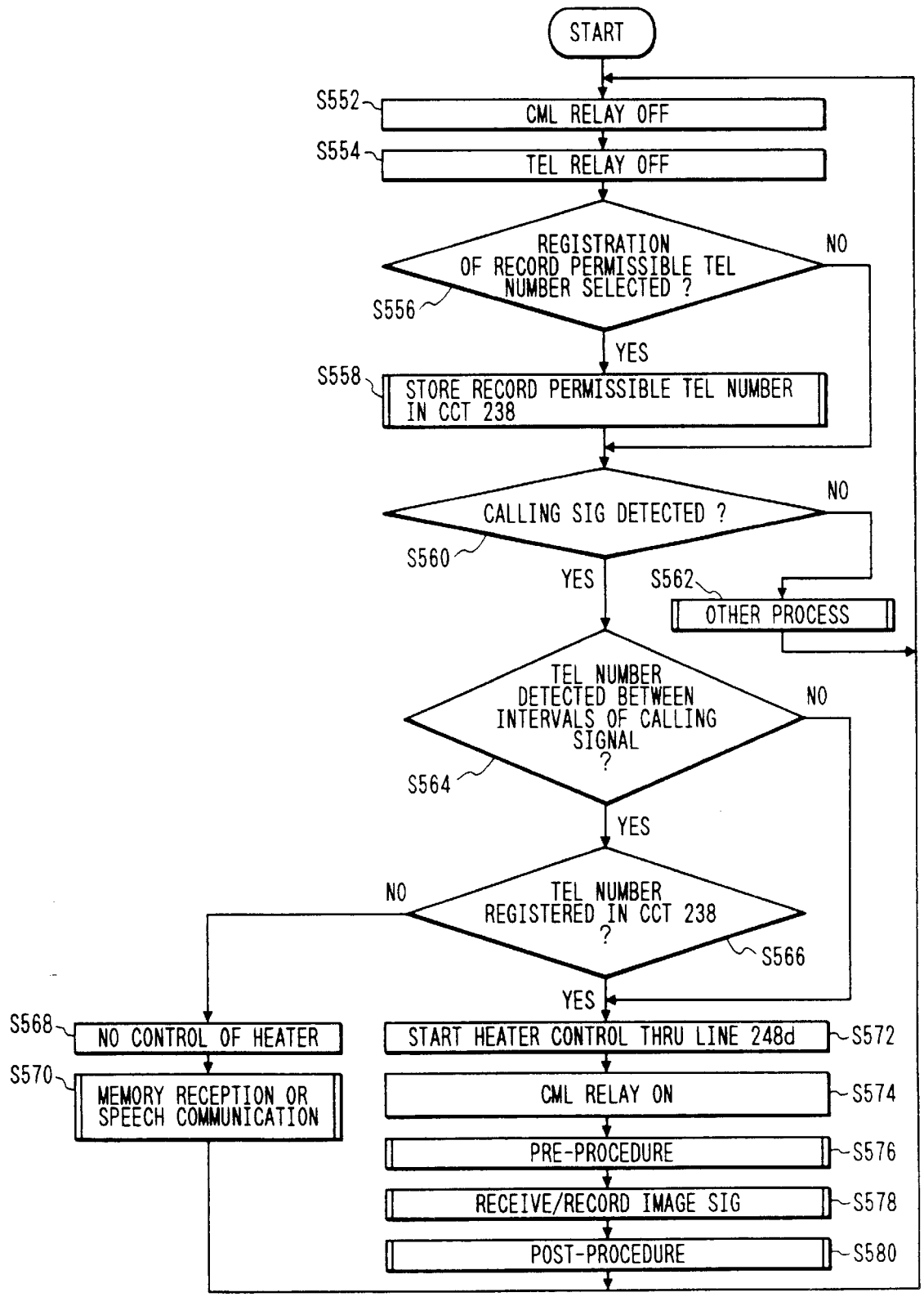
FIG. 7 is a flow chart showing the operation of the fifth embodiment of the present invention.

FIG. 7 is a flow chart showing the control operations of the control circuit 248 in the fifth embodiment of the present invention.

In step 552, a signal of signal level "0" is output onto the signal line 248a to turn off the CML relay 202. In step S554, a signal of signal level "0" is output onto the signal line 248b to turn off the TEL relay 204.

In step S556, data on the signal line 246a is received to check if a registration mode of a record permissible telephone number is selected. If YES in step S556, the flow advances to step S558 to store a record permissible telephone number of telephone number data sent between two adjacent calling signals in the telephone number storing circuit 238. Otherwise, the flow advances to step S560.

In step S560, data on the signal line 210a is received to check if a calling signal is detected. If YES in step S560, the flow advances to step S564; otherwise, the flow advances to step S562 to execute other processes.

In step S564, data on the signal line 212a is received to check if telephone number data is output between two adjacent calling signals. If YES in step S564, the flow advances to step S566; otherwise, the flow advances to step S572.

It is checked in step S566 if the telephone number detected between two adjacent calling signals is registered in the record permissible telephone number storing circuit 238. If YES in step S566, the flow advances to step S572; otherwise, the flow advances to step S568.

In step S568, heater control is stopped via the signal line 248d. In step S570, memory reception or a speech communication, i.e., an operation which does not require a record operation is performed.

In step S572, data on the signal line 236a is received to start heater control via the signal line 248d as needed. In step S574, a signal of signal level "1" is output onto the signal line 248a to turn on the CML relay.

In step S576, a pre-procedure is performed, and in step S578, an image signal is received and recorded. In this case, data from the thermistor on the signal line 236a is received to perform heater control upon recording. In step S580, a post procedure is performed.

Sixth Embodiment

The sixth embodiment of the present invention will be described below.

In the sixth embodiment, upon detection of an incoming call, the storing circuit 240, which registers a memory-receive telephone number, may detect telephone number data sent between two adjacent calling signals, and when it detects an incoming call from a station corresponding to the registered memory-receive telephone number, memory reception may be executed without executing a heat operation, in the fifth embodiment.

Note that as memory reception, confidential reception which requires a password before an output operation, and normal memory reception which does not require any password before an output operation will be exemplified.

Figure 8:
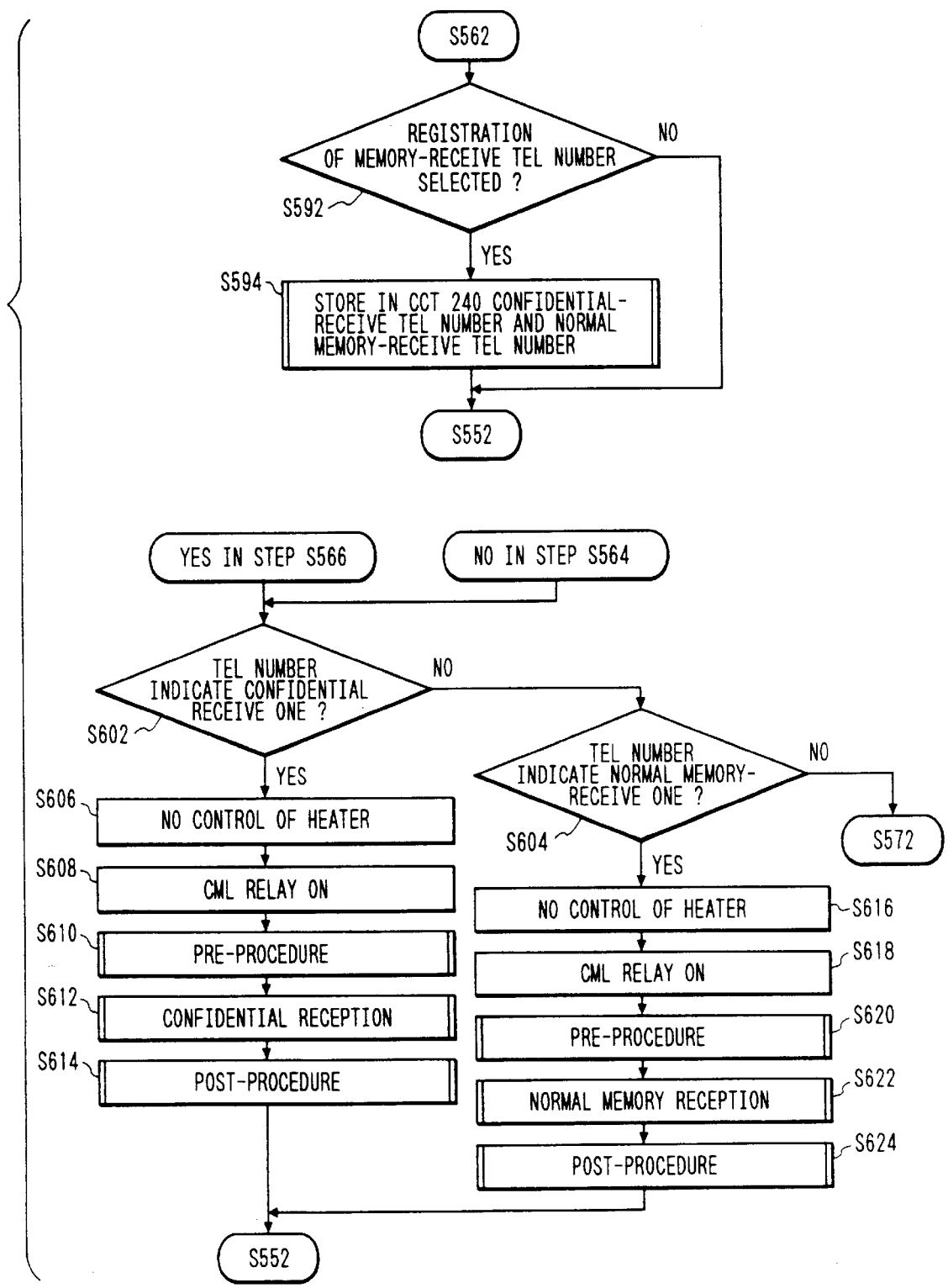
FIG. 8 is a flow chart showing the operation of the sixth embodiment of the present invention.

FIG. 8 is a flow chart showing operations different from FIG. 7, of the operations of the sixth embodiment.

In step S592, data on the signal line 246a is received to check if a registration mode of a memory-receive telephone number is selected. If YES in step S592, the flow advances to step S594; otherwise, the flow advances to step S596.

Of telephone number data sent between two adjacent calling signals, a confidential-receive telephone number or a normal memory-receive telephone number is stored in the circuit 240 in step S594.

In step S602, data on the signal line 210a is received to check by checking the circuit 240 if the telephone number sent between two adjacent calling signals indicates a calling station corresponding to a confidential-receive telephone number. If YES in step S602, the flow advances to step S606; otherwise, the flow advances to step S604.

In step S604, data on the signal line 210a is received to check by checking the circuit 240 if the telephone number sent between two adjacent calling signals indicates a calling station corresponding to a normal memory-receive telephone number. If YES in step S604, the flow advances to step S616; otherwise, the flow advances to step S572 in FIG. 7.

In step S606 or S616, the heater control is not performed via the signal line 248d. In step S608 or S618, a signal of signal level "1" is output onto the signal line 248a to turn on the CML relay. In step S610 or S620, a pre-procedure is performed.

In step S612, confidential reception which requires a password before an output operation is performed. In step S622, normal memory reception which does not require any password before an output operation is performed. In step S614 or S624, a post procedure is performed, and thereafter, the flow advances to step S552 in FIG. 7.

Seventh Embodiment

The seventh embodiment of the present invention will be described below.

In the seventh embodiment, when a memory-receive mode is set by the registration circuits 242 and 244, which respectively register the memory-receive mode set time and the memory-receive mode reset time, even when telephone number data sent between two adjacent calling signals indicates a record permissible station, the heat operation may be inhibited in the fifth embodiment.

Figure 9:
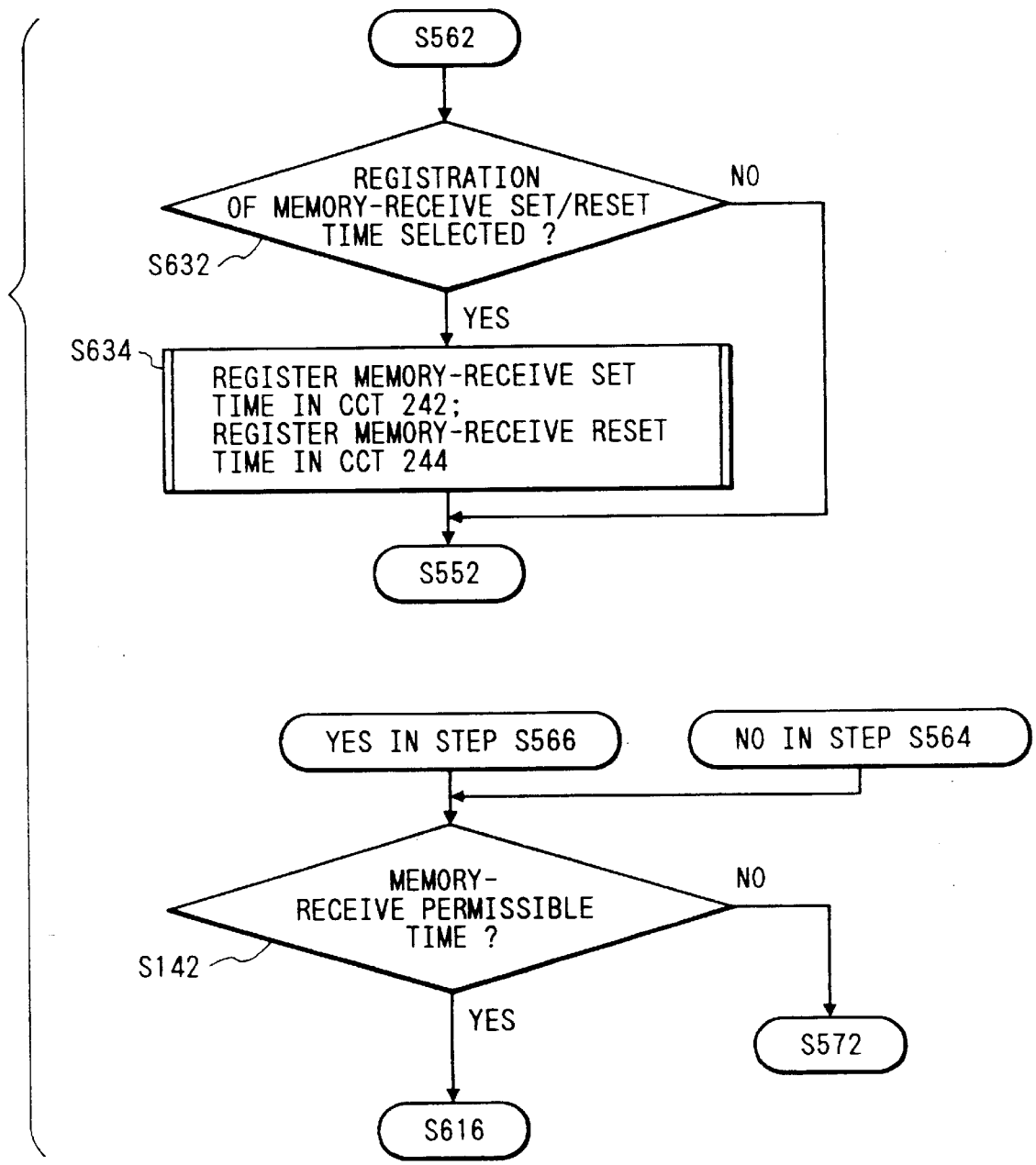
FIG. 9 is a flow chart showing the operation of the seventh embodiment of the present invention.

FIG. 9 is a flow chart showing operations different from FIG. 7, of the operations of the seventh embodiment.

In step S632, data on the signal line 246a is received to check if a registration mode of a time for setting or resetting memory reception is selected. If YES in step S632, the flow advances to step S634. In step S634, the memory-receive set time is stored in the circuit 242, and the memory-receive reset time is registered in the circuit 244. If NO in step S632, the flow advances to step S552 in FIG. 7.

In step S642, data are read out from the circuits 242 and 244 to check if the current time falls within a memory-receive permissible time range. If YES in step S624, the flow advances to step S616 in FIG. 8; otherwise, the flow advances to step S572 in FIG. 7.

Eighth Embodiment

Figure 10:
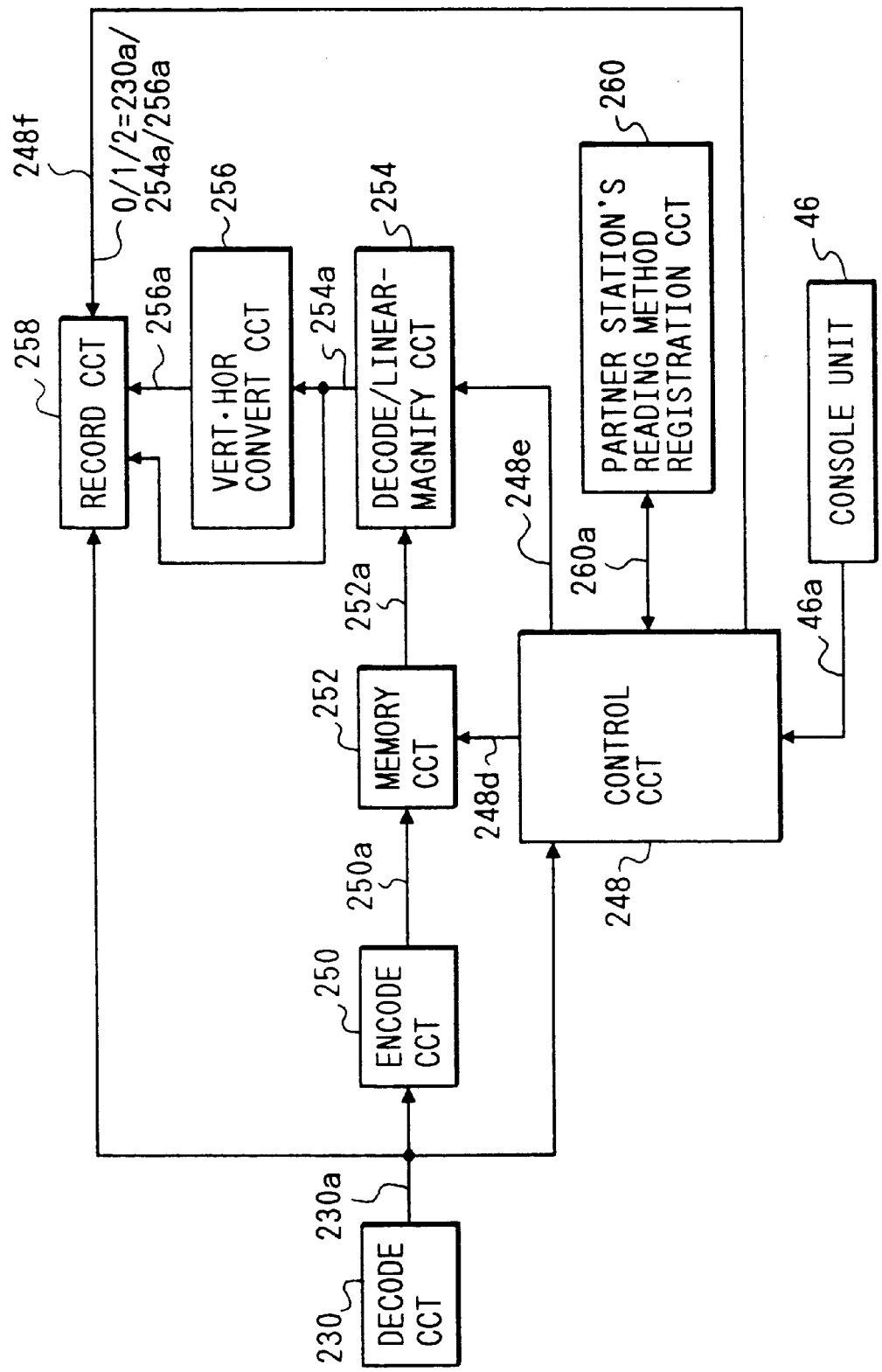
FIG. 10 is a block diagram showing the eighth embodiment of the present invention.

FIG. 10 shows circuits different from those in FIG. 6 of the fifth embodiment. Note that the circuits 238, 240, 242, 244, 232, 234, and 236 in FIG. 6 are not used in the eighth embodiment.

The same reference numerals in the eighth embodiment denote the same circuits as in the fifth embodiment, and a detailed description thereof will be omitted.

An encode circuit 250 receives decoded data output on the signal line 230a, re-encodes the data by MR encoding of K=8, and outputs the encoded data onto a signal line 250a.

A memory circuit 252 stores the MR-encoded data of K=8, which is output on the signal line 250a, in accordance with a control signal on the signal line 248d, and outputs stored data onto a signal line 252a in accordance with the control signal on the signal line 248d.

A decode/linear-magnify circuit 254 receives a signal output on the signal line 252a, decodes the signal by MR (Modified READ) of K=8, magnifies the decoded signal in the main scanning and sub-scanning directions in accordance with a variable magnification factor output on a signal line 248e, and outputs the data onto a signal line 254a.

A vertical•horizontal convert circuit 256 receives data output on the signal line 254a, and outputs data rotated through 90° onto a signal line 256a.

A record circuit 258 receives data output on the signal line 230a when a signal "0" is output on a signal line 248f, receives data output on the signal line 254a when a signal "1" is output on the signal line 248f, or receives data output on the signal line 256a when a signal "2" is output on the signal line 248f, and sequentially performs recording line by line.

A circuit 260 stores a reading method of a partner station (transmitter) via a signal line 260a in correspondence with telephone number data sent between two adjacent calling signals.

Figures 11, 11A:
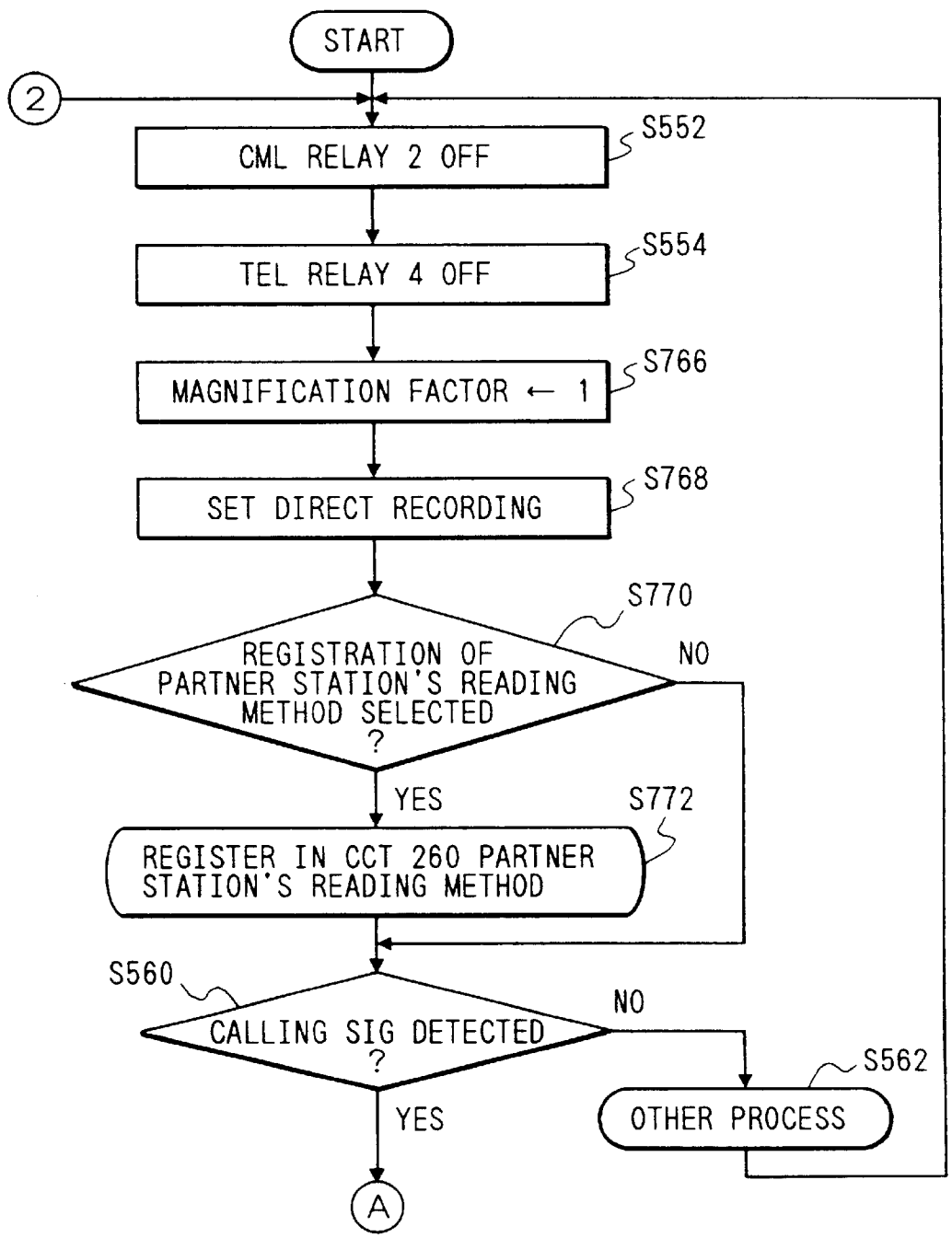
FIG. 11 is comprised of FIGS. 11A and 11B are flow charts showing the control operation of a control circuit 248 shown in FIG. 10.
Figure 11B:
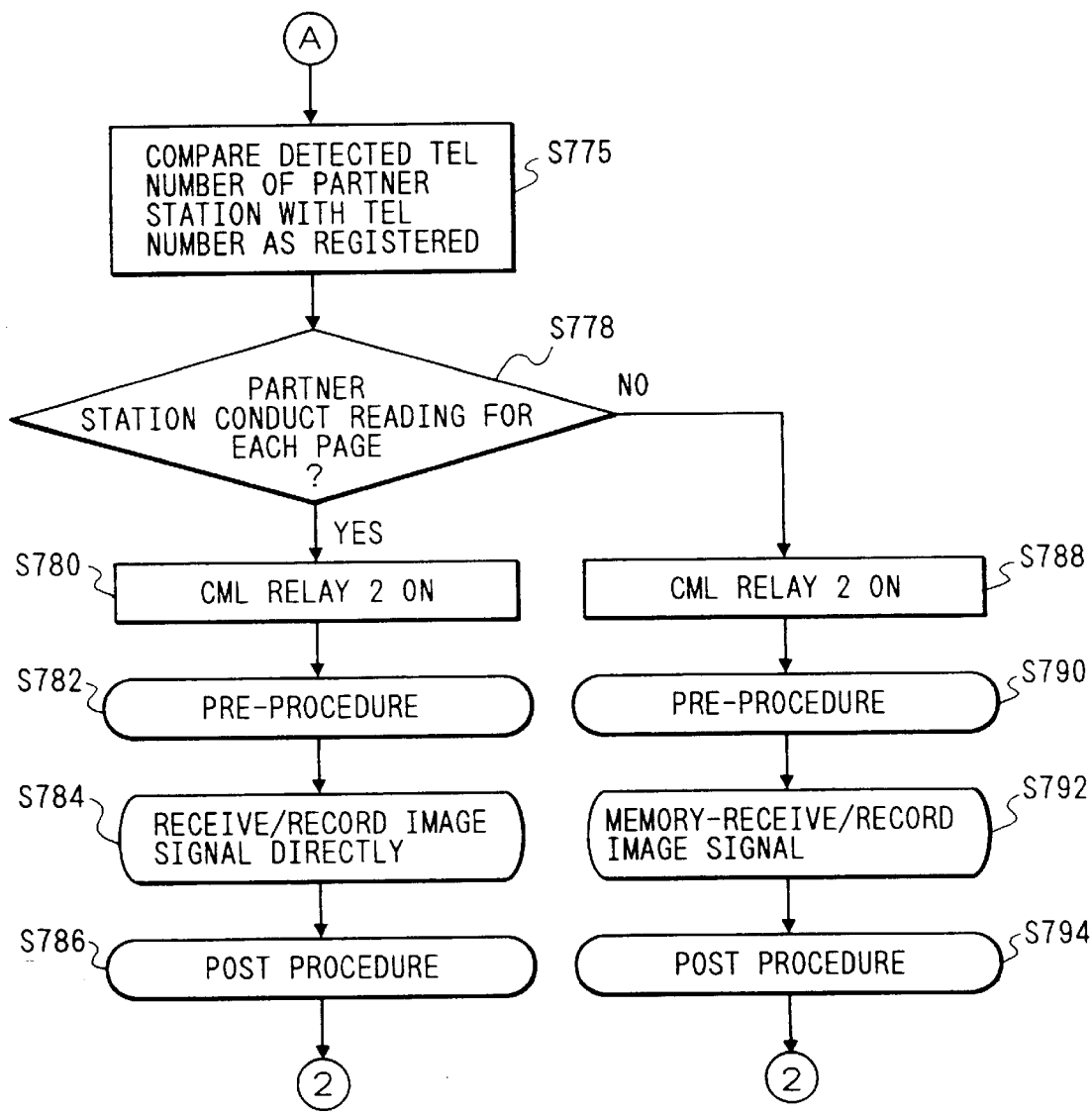

A control circuit 248 executes the flow chart described below with reference to FIGS. 11A and 11B.

The operation shown in FIGS. 11A and 11B will be described below. Note that the same step numbers in FIGS. 11A and 11B denote the same processing steps as in the fifth embodiment, and a detailed description thereof will be omitted.

In step S766, a designation signal for magnifying data to ×1 in both the main scanning and sub-scanning directions is output onto the signal line 248e (to designate an equal-magnification reading mode), and a ×1 magnification factor is set as the variable magnification factor in both the main scanning and subscanning directions in the decode/linear-magnify circuit 254.

In step S768, a signal "0" is output onto the signal line 248f to set the record circuit 258 to directly record decoded data output on the signal line 230a without modifying it.

In step S770, data output from the console unit onto a signal line 246a is received to check if a mode of registering a reading method in correspondence with the telephone number of a partner station is selected. If YES in step S770, the flow advances to step S772, and the reading method (reading method in units of pages or lines) of the partner station is registered in the circuit 260 in correspondence with the telephone number of the partner station. However, if NO in step S770, the flow jumps to step S560.

In step S775, data on the signal line 212a is received, and is compared with the telephone number of the partner station registered in the circuit 260. In step S778, it is checked if it is registered in the circuit 260 that the partner station corresponding to the telephone number input between two adjacent calling signals is a copy machine-integrated facsimile apparatus which performs reading in units of pages. If YES in step S778, the flow advances to step S780, and received data is directly recorded on a cut paper sheet without being modified. However, if NO in step S778, the flow advances to step S788 to perform a long-document process and a variable magnification process of the received information at the receiver side, and to record the modified data on a cut paper sheet.

In step S780, a signal of signal level "1" is output onto the signal line 248a to turn the CML relay 202, i.e., to connect the signal lines 202a and 202b to the signal lines 214a and 214b.

In step S782, a pre-procedure is performed.

In step S784, an image signal is received and recorded. In this case, since the partner station is a copying machine-integrated facsimile apparatus which reads data in units of pages, the receiver side can record the data on a cut sheet paper without modifying it. The record circuit 258 receives data on the signal line 230a, and records the received data. An A4-size original is read from its long side, the read data is transmitted, and the data is recorded in the same direction as the reading direction. On the other hand, an A3-size original is read from its short side, the read data is transmitted, and the data is recorded in the same direction as the reading direction.

In step S786, a post procedure is performed.

In step S788, a signal of signal level "1" is output onto the signal line 248a to turn the CML relay 202, i.e., to connect the signal lines 202a and 202b to the signal lines 214a and 214b.

In step S750, a pre-procedure is performed.

In step S792, a received image signal is stored in the memory circuit 252, and the signal read out from the memory circuit 252 is recorded. In this case, received data for one page is stored in the memory circuit 252. After the end of reception of the data for one page, if the data can be recorded on a single cut paper sheet, a variable magnification factor upon recording data on the cut paper sheet is set on the signal line 248e. When data, which is linearly magnified by the circuit 254, is recorded after it is subjected to length/width conversion, a signal "2" is output onto the signal line 248f, and the record circuit 258 receives and records the data on the signal line 256a. On the other hand, when data, which is linearly magnified by the circuit 254, is recorded without length/width conversion, a signal "1" is output onto the signal line 248f, and the record circuit 258 receives and records data on the signal line 254a. When data for one page cannot be recorded on a single cut paper sheet, a long document is divided into a plurality of pages, and these data are recorded.

In step S794, a post procedure is performed.

As described above, according to the present invention, in a facsimile apparatus which can perform SURF (surface rapier fusing) fixing recording, a heat operation can be performed even in a cold state early in the morning upon detection of an incoming call signal from a record permissible station, and a record operation can be immediately started.

Furthermore, upon detection of a calling signal from a station which does not require a record operation, no heat operation is performed. For this reason, an efficient facsimile apparatus which can prevent a wasteful heat operation can be provided.

An efficient facsimile apparatus which can prevent a wasteful heat operation upon detection of an incoming call from a station corresponding to a memory-receive telephone number or within a memory-receive time range, can be provided.

What is claimed is:

1. A communication apparatus comprising:
   reception means for receiving data;
   memory means for storing data received by said reception means;
   recording means for recording, on a recording paper, the data received by said reception means;
   detection means for detecting identification information of a calling side sent with a calling signal;
   registration means for selectively registering identification information of the calling side for permission to record the received data; and
   control means for determining whether the identification information detected by said detection means has been registered in said registration means, and for (1) storing the received data into said memory means in a case where the detected identification information has not been registered in said registration means, and (2) controlling said recording means to record, on the recording paper, the received data in a case where the detected identification information has been registered in said registration means.

2. An apparatus according to claim 1, wherein said recording means includes a thermal fixing unit, and wherein said control means keeps said thermal fixing unit off in a case of storing the received data into said memory means.

3. An apparatus according to claim 1, wherein said detection means detects the telephone number of the calling side from data sent between two adjacent calling signals.

4. An apparatus according to claim 1, wherein said control means sets a password to read stored data out of said memory means.

5. A communication apparatus comprising:
reception means for receiving data;
memory means for storing data received by said reception means;
recording means for recording, on a recording paper, the data received by said reception means;
detection means for detecting identification information of a calling side sent with a calling signal;
registration means for selectively registering identification information of the calling side;
setting means for setting a time range to store the received data into said memory means; and
control means for making a determination whether the identification information detected by said detection means has been registered in said registration means, and for selectively either storing the received data into said memory means or controlling said recording means to record, on the recording paper, the received data in accordance with a result of the determination and the time range.

6. A communication apparatus comprising:
reception means for receiving data;
modifying means for modifying data received by said reception means to form modified data;
recording means for recording data on a recording paper;
detection means for detecting identification information of a calling side sent with a calling signal;
registration means for selectively registering identification information of the calling side in correspondence with a type of data transmitted from the calling side; and
control means for making a determination whether the identification information detected by said detection means has been registered in said registration means, for causing said modifying means to modify the received data in accordance with the determination, and for controlling a recording operation of said recording means to record, on the recording paper, a selected one of the modified data and the received data in accordance the determination.

7. An apparatus according to claim 6, wherein said modifying means reduces data for one page to record the data on a single cut paper sheet.

8. An apparatus according to claim 6, wherein said modifying means divides data for one page to record the data on a plurality of cut paper sheets.

9. An apparatus according to claim 6, wherein said modifying means rotates data for one page.

10. A communication method comprising the steps of:
receiving data;
storing data received by said reception step;
recording, on a recording paper, the data received by said reception step by using a recording means;
detecting identification information of a calling side sent with a calling signal;
selectively registering identification information of the calling side for permission to record the received data; and
determining whether the identification information detected by said detection step has been registered in said registration step, for storing the received data in a case where the detected identification information has not been registered in said registration step, and for controlling said recording step to record, on the recording paper, the received data in a case where the detected identification information has been registered in said registration step.

11. A method according to claim 10, wherein said recording step uses a thermal fixing unit, and
wherein said method keeps the thermal fixing unit off in a case of storing the received data.

12. An apparatus according to claim 10, wherein said detection step detects the telephone number of the calling side from data sent between two adjacent calling signals.

13. An apparatus according to claim 10, wherein said method sets a password to read the stored data out of memory.

14. A communication method comprising the steps of:
receiving data;
storing the data received by said reception step;
recording, on a recording paper, the data received by said reception step by using a recording means;
detecting identification of a calling side sent with a calling signal;
selectively registering identification information of the calling side;
setting a time range to store the received data; and
making a determination whether the identification information detected by said detection step has been registered in said registration step, and for selectively either storing the received data or controlling said recording step to record, on the recording paper, the received data in accordance with a result of the determination and the time range.

15. A communication method comprising the steps of:
receiving data;
modifying data received by said reception step to form modified data;
recording data on a recording paper;
detecting identification information of a calling side sent with a calling signal;
selectively registering identification information of the calling side in correspondence with a type of data transmitted from the calling side; and
making a determination whether the identification information detected by said detection step has been registered in said registration step, causing said modifying step to modify the received data according to the determination, and for controlling a recording operation of said recording step to record, on the recording paper, a selected one of the modified data and the received data in accordance the determination.

16. A method according to claim 15, wherein said modifying step reduces data for one page to record the data on a single cut paper sheet.

17. A method according to claim 15, wherein said modifying step divides data for one page to record the data on a plurality of cut paper sheets.

18. A method according to claim 15, wherein said modifying step rotates data for one page.

* * * * *

UNITED STATES PATENT AND TRADEMARK OFFICE
CERTIFICATE OF CORRECTION

PATENT NO. : 5,960,068

DATED : September 28, 1999

INVENTOR(S) : TAKEHIRO YOSHIDA ET AL.

It is certified that error appears in the above-identified patent and that said Letters Patent is hereby corrected as shown below:

COLUMN 1

Line 67, "according an" should read --according to an--.

COLUMN 2

Line 20, "11 is" should read --11, which is--; and "11B" should read --11B,--.

COLUMN 3

Line 48, "One-touch" should read --one-touch--.

COLUMN 6

Line 50, "signa" should read --signal--.

COLUMN 8

Line 12, "corresponding" should read --corresponding to--.

UNITED STATES PATENT AND TRADEMARK OFFICE
CERTIFICATE OF CORRECTION

PATENT NO. : 5,960,068

DATED : September 28, 1999

INVENTOR(S) : TAKEHIRO YOSHIDA ET AL.

It is certified that error appears in the above-identified patent and that said Letters Patent is hereby corrected as shown below:

COLUMN 13

Line 49, "dance the" should read --dance with the--.

COLUMN 14

Line 57, "accordance" should read --accordance with--.

Signed and Sealed this

Sixth Day of June, 2000

Attest:

Attesting Officer

Q. TODD DICKINSON

Director of Patents and Trademarks